(12) United States Patent
Tsujino et al.

(10) Patent No.: US 12,467,902 B2
(45) Date of Patent: Nov. 11, 2025

(54) ANALYSIS DEVICE

(71) Applicant: SHARP KABUSHIKI KAISHA, Sakai (JP)

(72) Inventors: Kazuya Tsujino, Sakai (JP); Tomohiro Kosaka, Sakai (JP); Tomoko Teranishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 406 days.

(21) Appl. No.: 18/035,916

(22) PCT Filed: Jul. 21, 2021

(86) PCT No.: PCT/JP2021/027245
§ 371 (c)(1),
(2) Date: May 8, 2023

(87) PCT Pub. No.: WO2022/102172
PCT Pub. Date: May 19, 2022

(65) Prior Publication Data
US 2023/0408446 A1  Dec. 21, 2023

(30) Foreign Application Priority Data
Nov. 12, 2020  (JP) .................. 2020-188806

(51) Int. Cl.
*G01N 27/624* (2021.01)
(52) U.S. Cl.
CPC ................. *G01N 27/624* (2013.01)

(58) Field of Classification Search
CPC .. H01J 49/0009; H01J 49/0018; H01J 49/165; G01N 27/622; G01N 27/624
See application file for complete search history.

(56) References Cited

U.S. PATENT DOCUMENTS

| | | | |
|---|---|---|---|
| 6,489,610 B1 * | 12/2002 | Barofsky | H01J 49/061 250/282 |
| 6,495,823 B1 | 12/2002 | Miller et al. | |
| 6,512,224 B1 | 1/2003 | Miller et al. | |
| 6,815,669 B1 | 11/2004 | Miller et al. | |
| 7,098,449 B1 | 8/2006 | Miller et al. | |
| 7,122,794 B1 | 10/2006 | Miller et al. | |
| 2001/0030285 A1 | 10/2001 | Miller et al. | |

(Continued)

FOREIGN PATENT DOCUMENTS

JP  5570645 B2  8/2014

Primary Examiner — David E Smith
Assistant Examiner — Hsien C Tsai
(74) Attorney, Agent, or Firm — ScienBiziP, P.C.

(57) ABSTRACT

Provided is an analysis device capable of analyzing a wide range of ion concentrations. The analysis device includes: an ion separating unit selectively conducting a specific kind of ions from among a plurality of kinds of ions flowing through a flow path; a detection electrode provided in the flow path and disposed toward an outlet with respect to the ionization unit; and a deflection electrode positioned across the flow path from the detection electrode, and generating an electric field that moves the specific kind of ions toward the detection electrode. The deflection electrode is capable of adjusting a width of a region in which the electric field is generated in a width direction perpendicular to a direction in which the flow path extends.

10 Claims, 9 Drawing Sheets

(56) References Cited

U.S. PATENT DOCUMENTS

| | | |
|---|---|---|
| 2003/0052263 A1 | 3/2003 | Kaufman et al. |
| 2003/0132380 A1 | 7/2003 | Miller et al. |
| 2003/0146377 A1 | 8/2003 | Miller et al. |
| 2004/0094704 A1 | 5/2004 | Miller et al. |
| 2004/0124350 A1 | 7/2004 | Miller et al. |
| 2004/0240843 A1 | 12/2004 | Miller et al. |
| 2005/0017163 A1 | 1/2005 | Miller et al. |
| 2005/0023457 A1 | 2/2005 | Miller et al. |
| 2005/0029443 A1 | 2/2005 | Miller et al. |
| 2005/0029449 A1 | 2/2005 | Miller et al. |
| 2005/0040330 A1 | 2/2005 | Kaufman et al. |
| 2005/0051719 A1 | 3/2005 | Miller et al. |
| 2005/0133716 A1 | 6/2005 | Miller et al. |
| 2005/0139762 A1 | 6/2005 | Miller et al. |
| 2005/0145789 A1 | 7/2005 | Miller et al. |
| 2005/0156107 A1 | 7/2005 | Miller et al. |
| 2005/0173629 A1 | 8/2005 | Miller et al. |
| 2005/0253061 A1 | 11/2005 | Cameron et al. |
| 2005/0263699 A1 | 12/2005 | Miller et al. |
| 2006/0060768 A1 | 3/2006 | Kaufman et al. |
| 2006/0118717 A1 | 6/2006 | Miller et al. |
| 2006/0151687 A1 | 7/2006 | Miller et al. |
| 2006/0192102 A1 | 8/2006 | Miller et al. |
| 2006/0237642 A1 | 10/2006 | Miller et al. |
| 2006/0255255 A1 | 11/2006 | Miller et al. |
| 2007/0029477 A1 | 2/2007 | Miller et al. |
| 2007/0045530 A1 | 3/2007 | Miller et al. |
| 2007/0084999 A1 | 4/2007 | Miller et al. |
| 2007/0176092 A1 | 8/2007 | Miller et al. |
| 2007/0228269 A1 | 10/2007 | Miller et al. |
| 2007/0252082 A1 | 11/2007 | Miller et al. |
| 2008/0121794 A1 | 5/2008 | Miller et al. |
| 2008/0128609 A1 | 6/2008 | Miller et al. |
| 2008/0128612 A1 | 6/2008 | Miller et al. |
| 2008/0135745 A1 | 6/2008 | Miller et al. |
| 2008/0185512 A1 | 8/2008 | Miller et al. |
| 2008/0224032 A1 | 9/2008 | Miller et al. |
| 2009/0189064 A1 | 7/2009 | Miller et al. |
| 2012/0025070 A1 | 2/2012 | Miller et al. |
| 2013/0026357 A1* | 1/2013 | Matthews ............ G01N 27/622 250/281 |

\* cited by examiner

ANALYSIS DEVICE

TECHNICAL FIELD

The present disclosure relates to an analysis device.

BACKGROUND ART

The present application claims priority from Japanese Patent Application No. 2020-188806 filed on Nov. 12, 2020, the content of which is hereby incorporated by reference into this application. Patent Document 1 describes, for example, an asymmetric field ion mobility filter system.

CITATION LIST

Patent Document

[Patent Document 1] Japanese Patent No. 5570645

SUMMARY

Technical Problem

As to a device for analyzing ions utilizing ion mobility, such as the above filter system, there is a demand for analyzing a wider range of ion concentrations so that the device can analyze samples having various ion concentrations.

The present disclosure is essentially intended to provide an analysis device capable of analyzing a wide range of ion concentrations.

Solution to Problem

An analysis device according to an aspect of the present disclosure includes: an ion separating unit selectively conducting a specific kind of ions from among a plurality of kinds of ions flowing through a flow path; a detection electrode provided in the flow path and disposed toward an outlet with respect to the ionization unit; and a deflection electrode positioned across the flow path from the detection electrode, and generating an electric field that moves the specific kind of ions toward the detection electrode. The deflection electrode is capable of adjusting a width of a region in which the electric field is generated in a width direction perpendicular to a direction in which the flow path extends.

DESCRIPTION OF EMBODIMENTS

Described below will be examples of preferred embodiments of the present disclosure. Note that the embodiments below are mere examples. The present disclosure shall not be limited to the embodiments below.

First Embodiment

Configuration of Analysis Device 1

Figure 1:
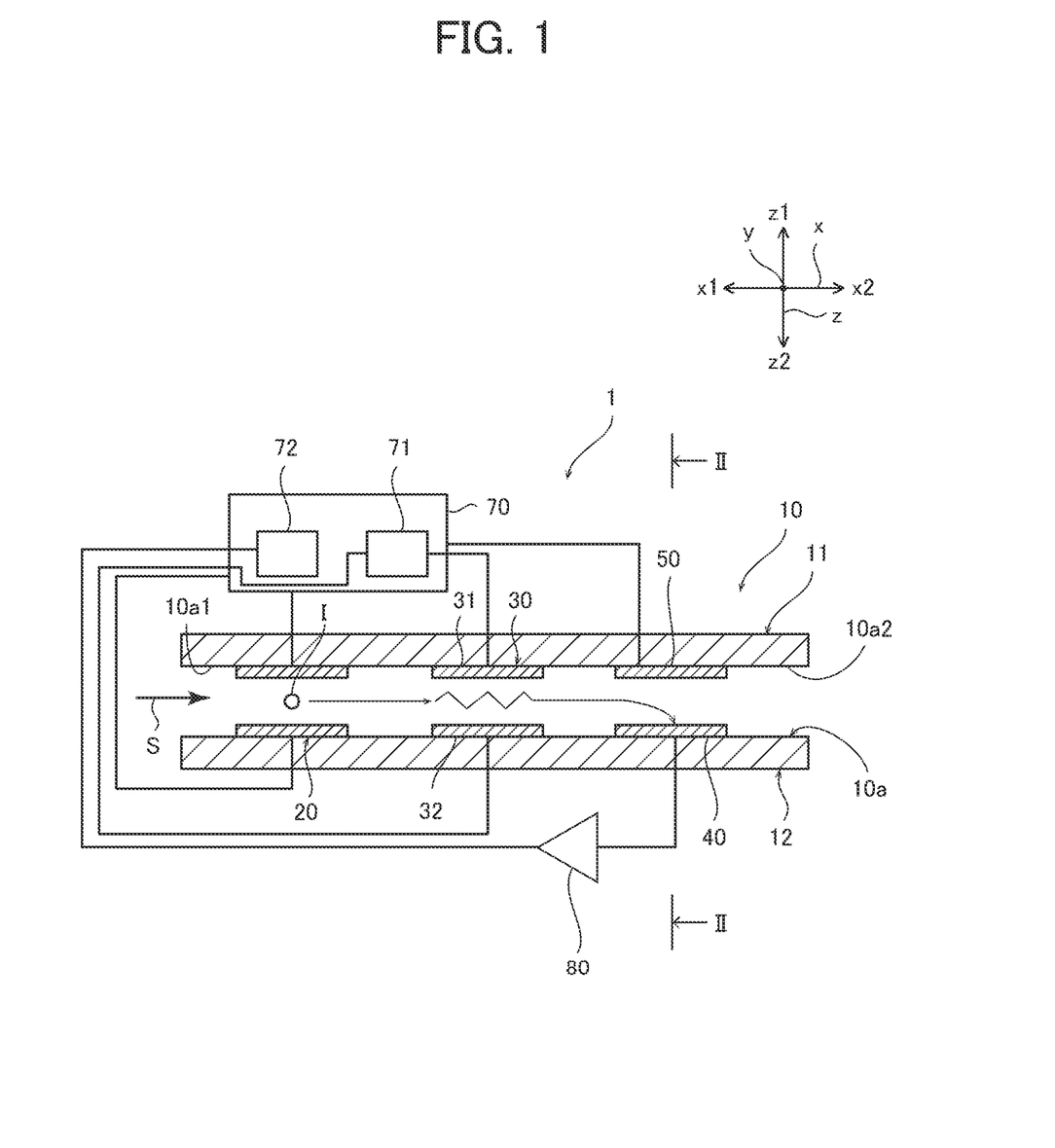
FIG. 1 is a schematic cross-sectional view of an analysis device according to an embodiment.
Figure 2:
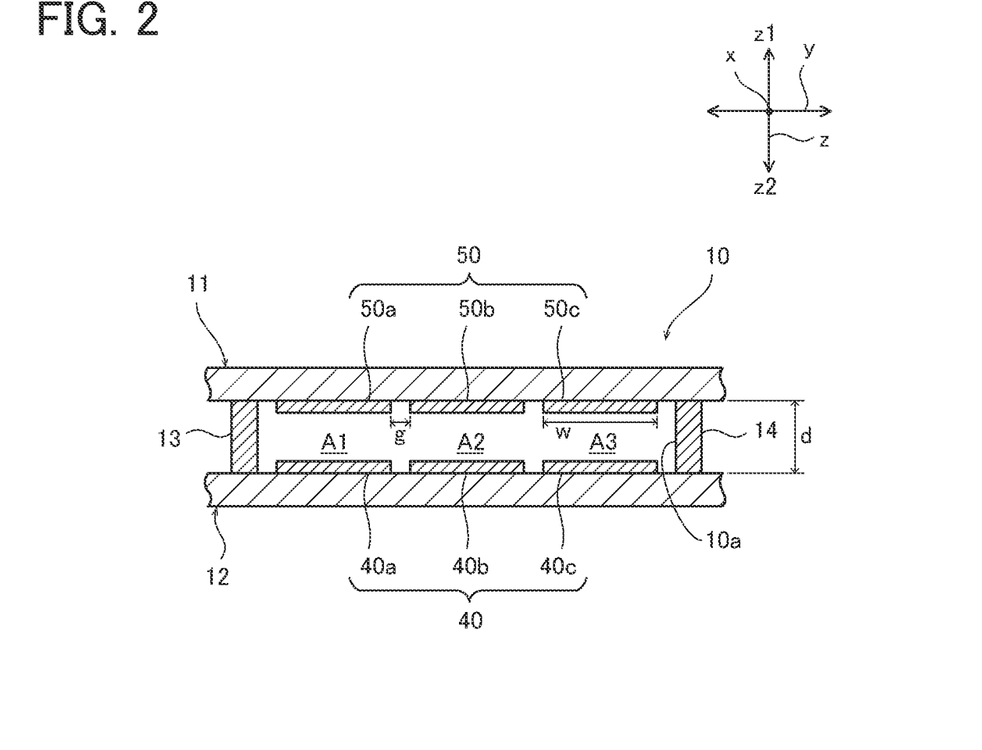
FIG. 2 is a schematic cross-sectional view taken along line II-II of FIG. 1.

FIG. 1 is a schematic cross-sectional view of an analysis device 1. FIG. 2 is a schematic cross-sectional view of the analysis device 1, taken along line II-II of FIG. 1.

Ions fly in different directions, depending on kinds of the ions, in an electric field formed upon, for example, application of a high-frequency voltage having an asymmetric waveform. Taking advantage of such a characteristic, the analysis device 1 illustrated in FIG. 1 is capable of separating a specific kind of ions from a plurality of kinds of ions and analyzing a concentration of the separated ions. The analysis device 1 of this embodiment is, specifically, a Field Asymmetric Ion Mobility Spectrometer (FA-IMS). Note that the analysis device according to the present disclosure shall not be limited to the FA-IMS.

The analysis device 1 includes: a flow path member 10; an ionization unit 20; an ion separating unit 30; a detection electrode 40; a deflection electrode 50; and a control unit 70.

The flow path member 10 forms a flow path 10a. The flow path 10a extends from toward x1 (from toward an inlet) in an x-axis direction toward x2 (to toward an outlet). That is, in this embodiment, the flow path 10a extends in the x-axis direction.

Note that, in this embodiment, the flow path 10a extends linearly. However, in the present disclosure, the flow path may extend in any given direction. The flow path may be, for example, curved.

As illustrated in FIG. 2, the flow path member 10 includes: a first wall portion 11; a second wall portion 12; a first sidewall portion 13; and a second sidewall portion 14.

The first wall portion 11 and the second wall portion 12 are positioned across the flow path 10a from each other. The first wall portion 11 and the second wall portion 12 are positioned across from each other in a z-axis direction. The z-axis direction is perpendicular to the x-axis direction.

The first sidewall portion 13 and the second sidewall portion 14 are arranged between the first wall portion 11 and the second wall portion 12. The first sidewall portion 13 and the second sidewall portion 14 are respectively joined to the first wall portion 11 and the second wall portion 12. The first sidewall portion 13 and the second sidewall portion 14 are positioned across from each other at an interval in a y-axis direction. The first sidewall portion 13 and the second sidewall portion 14 extend in the x-axis direction. The first sidewall portion 13, the second sidewall portion 14, the first wall portion 11, and the second wall portion 12 define the flow path 10a whose cross-section is shaped into a substantial rectangle.

As illustrated in FIG. 1, the flow path 10a has an end portion 10a1 provided toward the inlet (toward the x1) and connected to a not-shown sample supplying unit. The sample supplying unit supplies the flow path 10a with a sample (specimen) S to be analyzed. The sample S is supplied from the end portion 10a1 provided toward the inlet. The sample S is preferably, for example, a gaseous sample. More preferably, the sample S is a gaseous sample containing ionizable molecules.

The flow path 10a has an end portion 10a2 provided toward the outlet (toward the x2) and connected to a not-shown pump. The pump sucks a gas in the flow path 10a. Hence, the sample S supplied from the sample suppling unit is transferred from toward the inlet to toward the outlet of the flow path 10a.

The ionization unit 20 at least partially ionizes the molecules contained in the sample S flowing through the flow path 10a, to generate ions I. Typically, a plurality of kinds of ions I are generated from the sample S. The ionization unit 20 is any given unit as long as the unit can ionize the sample S. The ionization unit 20 may ionize ions by, for example, corona discharge. The ionization unit 20 may be an electron-emitting element. For example, if the ionization unit 20 is an electron-emitting element, the ionization unit 20 may include: an upper electrode; a lower electrode; a counter electrode; and an insulating layer disposed between the upper electrode and the lower electrode. In this embodiment, specifically, the ionization unit 20 has a pair of electrodes 21 and 22 positioned across the flow path 10a from each other. For example, if the ionization unit 20 ionizes ions by, for example, corona discharge, the ionization unit 20 may have a pair of electrodes. Moreover, the ionization unit 20 may be, for example, a radiation source or an ultraviolet ray source (for example, an ultraviolet lamp).

An ion separating unit 30 is disposed in the x-axis direction toward the outlet (toward the x2) with respect to the ionization unit 20. The ion separating unit 30 selectively conducts a specific kind of ions I from among a plurality of kinds of ions I flowing through the flow path Specifically, the ion separating unit 30 selectively conducts the specific kind of ions I from among the plurality of kinds of ions I flowing through the flow path 10a, and blocks the remaining kinds of ions I. Typically, the ion separating unit 30 conducts only one kind of ions I.

In the present embodiment, the ion separating unit 30 includes a pair of application electrodes 31 and 32. The application electrodes 31 and 32 in the pair are positioned across the flow path 10a from each other. In this embodiment, the application electrodes 31 and 32 in the pair are positioned across from each other in the z-axis direction. Note that the application electrodes in the pair are positioned across from each other in any given direction. For example, the application electrodes in the pair may be positioned across from each other in the y-axis direction.

Between the pair of application electrodes 31 and 32, a high-frequency voltage having an asymmetric waveform is applied. Thus, a high-frequency electric field having an asymmetric waveform is applied to the flow path 10a through which the ions I flow. In this embodiment, specifically, a high-frequency voltage having an asymmetric waveform is applied to the first application electrode 31 provided on the first wall portion 11. The second application electrode 32 provided on the second wall portion 12 is connected to the ground. Note that the second application electrode 32 does not have to be directly connected to the ground. In this embodiment, specifically, the second application electrode 32 is indirectly connected to the ground through the control unit 70. The second application electrode 32 is preferably held at a constant potential.

The detection electrode 40 is positioned in the flow path 10a. The detection electrode 40 is disposed in the x-axis direction toward the outlet with respect to the application electrodes 31 and 32. The detection electrode 40 is an electrode that detects ions I passing through the ion separating unit 30 and reaching the detection electrode 40. At the detection electrode 40, a current is generated such that a magnitude of the generated current corresponds to the number of the ions I reaching the detection electrode 40.

Between the detection electrode 40 and the control unit 70, an amplifier 80 is disposed. The amplifier 80 amplifies a current value detected by the detection electrode 40. Note that the amplifier 80 is not essential. For example, the amplifier may be omitted, and the software in the control unit 70 may amplify the current value. Moreover, the control unit 70 may include an amplifier circuit. Note that the amplifier 80 may convert the magnitude of the current generated at the detection electrode 40 into, for example, another parameter such as a voltage value, and then amplify the current. Hence, the amplifier 80 outputs, to the control unit 70, the amplified value corresponding to the current value.

The deflection electrode 50 is disposed in the x-axis direction toward the outlet with respect to the pair of application electrodes 31 and 32. The deflection electrode 50 is positioned across the flow path 10a from the detection electrode 40. The deflection electrode 50 generates an electric field that moves the ions I toward the detection electrode 40. That is, a voltage is applied to the deflection electrode 50 so that the deflection electrode 50 generates an electric field that moves the ions I toward the detection electrode 40.

Note that the deflection electrode 50 preferably generates a direct electric field that moves the ions I toward the detection electrode 40. For example, if negative ions are to be moved toward the detection electrode 40, a negative voltage is preferably applied to the deflection electrode 50. For example, if positive ions are to be moved toward the detection electrode 40, a positive voltage is preferably applied to the deflection electrode 50.

Note that, in the present disclosure, the electric field generated by the deflection electrode 50 may be any given electric field as long as the electric field can move the ions I toward the detection electrode 40. The electric field generated by the deflection electrode 50 may be, for example, an offset alternating electric field.

As illustrated in FIG. 2, the deflection electrode 50 includes a plurality of first deflection electrode pieces 50a, 50b, and 50c. The plurality of deflection electrode pieces 50a, 50b, and 50c are arranged at intervals in one flow channel 10a in the y-axis direction; namely, the width direction. The plurality of deflection electrode pieces 50a, 50b, and 50c are connected to the control unit 70. Hence, the voltage can be applied to some or all of the plurality of deflection electrode pieces 50a, 50b, and 50c. The voltage is applied to the deflection electrode pieces 50a, 50b, and 50c in various manners, thereby successfully adjusting a y-axis width of a region in which the electric field is generated. Hence, the deflection electrode 50 is capable of adjusting the width of the region in which the electric field is generated in the width direction (the y-axis direction) perpendicular to the x-axis direction in which the flow path 10a extends.

In this embodiment, the deflection electrode pieces 50a, 50b, and 50c have the same y-axis width. The deflection electrode pieces 50a, 50b and 50c are the same in area in a plan view (when viewed from the z-axis direction), and congruent. Note that, in the present disclosure, each of the plurality of deflection electrode pieces has any given shape and size. For example, the plurality of deflection electrode pieces may include a plurality of deflection electrode pieces having different shapes and sizes from one another, or the plurality of deflection electrode pieces may have different shapes and sizes from one another. Note that the plurality of deflection electrode pieces are preferably designed so that widthwise dimensions of portions of the deflection electrode pieces toward the inlet of the flow path are substantially equal to one another.

The deflection electrode pieces 50a, 50b and 50c are rectangular in plan view. Note that, in the present disclosure, the deflection electrode pieces have any given shape. The deflection electrode pieces may be, for example, polygonal, circular, oval, or elongated.

This embodiment describes an example in which the deflection electrode 50 includes the three deflection electrode pieces 50a, 50b and 50c. Note that the present invention shall not be limited to such an example. The deflection electrode may have two or more deflection electrode pieces arranged in the width direction. The deflection electrode may have, for example, two, or four or more deflection electrode pieces arranged in the width direction. The deflection electrode includes, for example, preferably two or more and five or less deflection electrode pieces, and more preferably, two or more and four or less deflection electrode pieces.

The detection electrode 40 positioned across the flow path 10a from the deflection electrode 50 includes a plurality of detection electrode pieces 40a, 40b, and 40c. The plurality of detection electrode pieces 40a, 40b, and 40c are arranged at intervals in the y-axis direction. The detection electrode pieces 40a, 40b and 40c included in the detection electrode 40 are equal in number to the deflection electrode pieces 50a, 50b and 50c included in the deflection electrode 50. Each of the plurality of detection electrode pieces 40a, 40b, and 40c is positioned across from any one of the deflection electrode pieces 50a, 50b, and 50c. Specifically, the detection electrode piece 40a and the deflection electrode piece 50a are positioned across from each other. The detection electrode piece 40b and the deflection electrode piece 50b are positioned across from each other. The detection electrode piece 40c and the deflection electrode piece 50c are positioned across from each other. The detection electrode pieces 40a, 40b, and 40c and the deflection electrode pieces 50a, 50b, and 50c, which are positioned respectively across from each other, are the same in area and congruent.

In this embodiment, all of the plurality of detection electrode pieces 40a, 40b, and 40c are connected to the control unit 70 through the amplifier 80. Hence, currents generated at all of the plurality of detection electrode pieces 40a, 40b, and 40c are collectively output to the control unit 70. Note that a value to be input to the control unit 70 does not have to be a current value. For example, a value (such as a voltage value) calculated from, and corresponding to, a current value may be input to the control unit 70.

This embodiment describes an example in which the separate detection electrode pieces 40a, 40b, and 40c are respectively provided for the deflection electrode pieces 50a, 50b, and 50c. Note that the present disclosure shall not be limited to such an example. For example, the detection electrodes may be formed into a single-piece electrode positioned across from a plurality of deflection electrode pieces.

The control unit 70 is connected to each of the not-shown sample supplying unit, the ionization unit 20, the pair of application electrodes 31 and 32, the detection electrode 40, the deflection electrode 50, and the not-shown pump.

The control unit 70 applies a voltage to the deflection electrode 50 and calculates an ion concentration in accordance with the current value detected by the detection electrode 40. Note that, in the present disclosure, the statement "calculating the ion concentration in accordance with the current value detected by the detection electrode" includes not only a case where the ion concentration is calculated in accordance with the magnitude of the current per se generated at the detection electrode but also a case where the ion concentration is calculated in accordance with another parameter corresponding to the magnitude of the current generated at the detection electrode. That is, in the present disclosure, the control unit may calculate the ion concentration in accordance with another parameter corresponding to the magnitude of the current generated at the detection electrode. The other parameter corresponding to the magnitude of the current generated at the detection electrode may be input to the control unit from another source or may be calculated by the control unit.

Specifically, the control unit 70 includes a generation unit 71 and a calculation unit 72. The generation unit 71 is connected to the first application electrode 31. The generation unit 71 inputs, to the first application electrode 31, a high-frequency voltage having an asymmetric waveform. Here, the statement "high-frequency voltage having an asymmetric waveform" refers to a high-frequency voltage having a waveform in which a negative voltage and a positive voltage are different from each other. Note that the second application electrode 32 may be connected to the generation unit 71, and the generation unit 71 may apply a voltage to the second application electrode 32.

Figure 3:
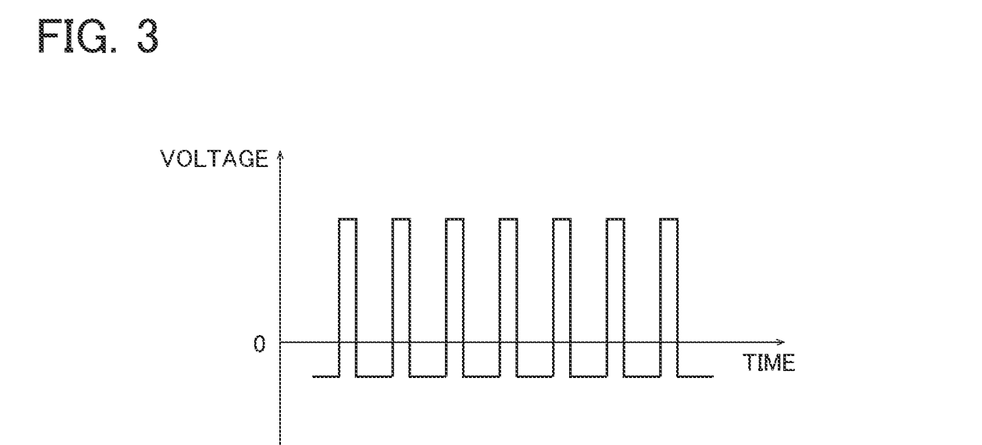
FIG. 3 is a graph representing an example of a voltage applied between a pair of application electrodes.

FIG. 3 shows an example of a high-frequency voltage having an asymmetric waveform. The high-frequency voltage illustrated in FIG. 3 shows that the absolute value of a positive potential and the absolute value of a negative potential are different from each other, and the period during which a positive voltage is applied and the period during which a negative voltage is applied are different from each other. Hence, the high-frequency high voltage has a waveform asymmetrically formed.

In the waveform representing the high-frequency voltage, an area A of a region surrounded by a portion positioned toward the positive potential and by 0 V and an area B of a region surrounded by a portion positioned toward the negative potential and by 0 V may be different from each other. Note that the high-frequency voltage preferably has a basic waveform in which the area A and the area B are equal in waveform to each other.

The calculation unit 72 is connected to the detection electrode 40. The calculation unit 72 calculates a concentration of the ions I contained in the sample S in accordance with a value of the current generated because the ions I reach the detection electrode 40. As the ions I reach the detection electrode 40 in greater number, the magnitude of the current flowing from the detection electrode 40 increases further. Hence, the calculation unit 72 can calculate the concentration of the ions I contained in the sample S in accordance with the value of the current flowing from the detection electrode 40.

Ion Analysis by Analysis Device 1

Described next is an ion analysis technique to be used for the analysis apparatus 1 mainly with reference to FIGS. 1 and 2.

As illustrated in FIG. 1, first, the gaseous sample S is supplied from the end portion 10a1 included in the flow path 10a and provided toward the inlet (toward the x1). The supplied sample S is sucked by the pump connected to the end portion 10a2, and flows through the flow path 10a from toward the inlet to toward the outlet.

The sample S is ionized by the ionization unit 20. Specifically, ionizable molecules contained in the sample S are ionized by the ionization unit 20. As a result, the ions I are generated. Typically, the sample S includes a plurality of kinds of ionizable molecules. Hence, the ionization unit 20 generates a plurality of kinds of the ions I.

The generated ions I are supplied to the ion separating unit 30. As described above, between the pair of application electrodes 31 and 32 in the ion separating unit 30, a high-frequency voltage having an asymmetric waveform is applied.

For example, when a potential of the high-frequency voltage applied to the pair of application electrodes 31 and 32 reaches a certain value or above, the plurality of kinds of ions I exhibit different non-linear mobilities in a high electric-field region generated by the potential. Hence, even if the high-frequency voltage has a basic waveform in which the area A, obtained by a product of a positive potential and an application period of the positive potential, and the area B, obtained by a product of a negative potential and an application period of the negative potential, are equal to each other, the ions fly in different trajectories. On the other hand, the application voltage, to be applied between the pair of application electrodes 31 and 33 by the high-frequency voltage having a basic waveform, is off-set either toward the positive potential or toward the negative potential. Such a feature makes it possible to adjust the flight trajectories of the ions. Hence, a specific kind of ions I can selectively pass through a region provided with the pair of application electrodes 31 and 32.

Passing through the ion separating unit 30, the ions I of the specific kind reach a region provided with the deflection electrode 50 and the detection electrode 40. The ions I of the specific kind are moved toward the detection electrode 40 by the electric field generated by the deflection electrode 50, and captured by the detection electrode 40. At the detection electrode 40, a current is generated such that a magnitude of the generated current corresponds to the number of the captured ions I. When this current is detected, the concentration of ions I can be analyzed.

The concentration is not always constant of a substance-to-be-analyzed contained in the sample S to be supplied to the analysis device 1. The concentration of the substance-to-be-analyzed contained in the sample S might vary. For example, if the substance-to-be-analyzed contained in the sample S exhibits an excessively high concentration, the magnitude of the current detected by the detection electrode is probably excessively large to exceed a range of the current value that the control unit can detect. In such a case, the ion concentration might not be measured with high precision.

In the analysis device 1, the deflection electrode 50 can adjust the width of a region in which an electric field is generated in the y-axis direction; that is, the width direction. Hence, for example, if the substance-to-be-analyzed contained in the sample S exhibits an excessively high concentration, the deflection electrode 50 can reduce the y-axis width of the region in which the electric field is generated. Such a feature can reduce the number of the ions I to reach the detection electrode 40. Hence, even if the substance-to-be-analyzed contained in the sample S exhibits an excessively high concentration, the magnitude of the current detected by the detection electrode can be kept from exceeding the range of the current value that the control unit 70 can detect. Thus, the analysis device 1 can analyze a wide range of ion concentrations. The analysis device 1 can analyze ion concentrations with high precision even if the substance-to-be-analyzed contained in the sample S exhibits either a low concentration or a high concentration.

Described next in more detail is the ion analysis technique to be used for the analysis device 1 mainly with reference to FIG. 4.

Figure 4:
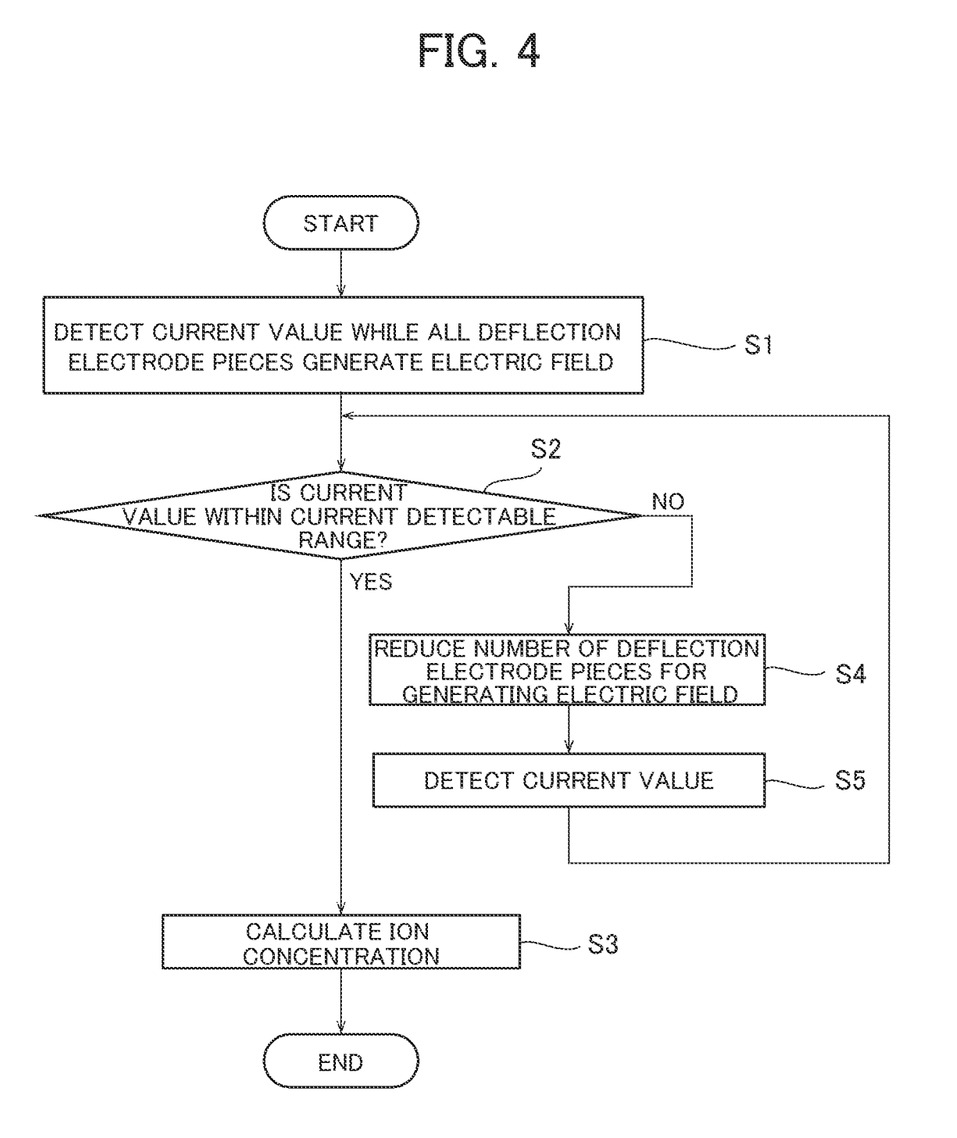
FIG. 4 is a flowchart showing an example of an ion analysis technique according to the first embodiment.

As shown in FIG. 4, first, at Step S1, a voltage is applied to all of the plurality of deflection electrode pieces 50a, 50b, and 50c to generate an electric field at all of the plurality of deflection electrode pieces 50a, 50b, and 50c. In this state, the control unit 70 detects a magnitude of the current generated at the detection electrode 40.

At Step S1, an electric field is generated in all of: a region A1 (see FIG. 2) between the deflection electrode piece 50a and the detection electrode piece 40a positioned across from each other; a region A2 between the deflection electrode piece 50b and the detection electrode piece 40b positioned across from each other, and a region A3 between the deflection electrode piece 50c and the detection electrode piece 40c positioned across from each other. Hence, substantially all of the ions I passing through all of the regions A1, A2, and A3 reach the detection electrode 40.

Next, at Step S2, the control unit 70 determines whether a current value detected at Step S1 is within a current detectable range of the control unit 70. Note that, at Step S1, the control unit 70 may determine whether another parameter corresponding to the current value is within the parameter detectable range of the control unit 70.

At Step S2, if the control unit 70 determines that the detected current value is within the current detectable range of the control unit 70, the process proceeds to Step S3.

On the other hand, at Step S2, if the control unit 70 determines that the detected current value is out of the current detectable range of the control unit 70, the process proceeds to Step S4.

At Step S4, the control unit 70 reduces the number of the deflection electrode pieces 50a, 50b, and 50c to which the voltage is applied. Thus, the control unit 70 reduces the number of deflection electrode pieces 50a, 50b, and 50c for generating an electric field. For example, at Step S1, if an electric field is generated by all of the deflection electrode pieces 50a, 50b and 50c, the electric field is generated by the two deflection electrode pieces 50a and 50b. Such a feature reduces the width of the region in which the voltage of the deflection electrode 50 is applied in the y-axis direction; that is, the width direction.

For example, if an electric field is generated by the deflection electrode pieces 50a and 50b but not by the deflection electrode piece 50c, the electric field is applied to the regions A1 and A2 illustrated in FIG. 2 but not substantially applied to the region A3. Such a feature allows ions I, included in the ions I flowing in the flow path 10a and passing through the regions A1 and A2, to reach the detection electrode 40. Hence, the feature can reduce the number of ions I reaching the detection electrode 40 compared with a case where ions I passing through all of the regions A1, A2, and A3 reach the detection electrode 40. The reduction in the number of the ions I can decrease the magnitude of the current generated at the detection electrode 40.

Next, at Step S5, the control unit 70 detects the magnitude of the current generated at the detection electrode 40.

When Step S5 ends, Step S2 is carried out again. That is, the number of the deflection electrode pieces 50a, 50b, and 50c for generating an electric field is reduced, and the magnitude of the current to be generated at the detection electrode 40 is decreased. In such a state, whether the detected current value is within the detectable range of the control unit 70 is determined again. If the determination indicates that the detected current value is within the detectable range, the process proceeds to Step S3.

On the other hand, at Step S2 for the second time, if the determination indicates that the detected current value is out of the detectable range, Step S4 is carried out again. At Step S4 for the second time, the control unit 70 further reduces the number of the deflection electrode pieces 50a and 50b for generating an electric field. Specifically, for example, the control unit 70 designates the deflection electrode piece 50a as the only deflection electrode piece for generating the electric field. Thanks to such a feature, among the ions I flowing through the flow path 10a, ions I substantially passing through the region A1 alone reach the detection electrode 40. Hence, the magnitude of the current generated at the detection electrode 40 is further decreased.

Next, at Step S5 for the second time, the control unit 70 detects again the magnitude of the current generated at the detection electrode 40. After that, Step S2 and the subsequent Steps are carried out again.

At Step S3, the control unit 70 calculates the ion concentration in accordance with the detected current value.

As described above, this embodiment describes an example in which the number of the deflection electrode pieces 50a, 50b, and 50c for generating an electric field is reduced so that the detected current value comes within the detectable range. Note that the present disclosure shall not be limited to such an example. For example, the number of deflection electrode pieces for generating the electric field may be increased so that a large magnitude of the current can be detected within the detectable range.

As described above, in this embodiment, the control unit 70 applies a voltage to the deflection electrode 50 so that the current value detected by the detection electrode 40 comes within a detectable range of the current value. Particularly, if the current value detected by the detection electrode 40 exceeds the detectable range of the current value, the control unit 70 applies a voltage to the deflection electrode 50 to reduce the y-axis width of the region in which the voltage is applied to the deflection electrode 50. Specifically, the control unit 70 applies a voltage to the deflection electrode pieces 50a, 50b, and 50c to generate an electric field so that the current value detected by the detection electrode 40 comes within the detectable range. Thus, the ion concentration can be measured when the current value detected by the detection electrode 40 is within the detectable range. Hence, the analysis device 1 can measure the ion concentration with high precision.

For example, as a technique to vary a current value to be input to the control unit, a possible technique involves varying an amplification factor of the amplifier. However, the variation in the amplification factor of the amplifier might also cause such problems as amplification of a noise component and variation in frequency characteristics. To overcome these problems, the control unit might be inevitably complex in configuration and processing. On the other hand, the analysis device 1 changes the number of the deflection electrode pieces 50a, 50b, and 50c for generating the electric field, such that the above problems are less likely to occur.

For example, even if a voltage is applied only to the deflection electrode piece 50b among the three deflection electrode pieces 50a, 50b, and 50c illustrated in FIG. 2, a weak electric field can also be generated between the deflection electrode piece 50b and the detection electrode pieces 40a and 40c. From this point of view, a distance g is preferably short between the deflection electrode pieces 50a, 50b and 50c and between the detection electrode pieces 40a, 40b and 40c adjacent to each other in the y-axis direction. Preferably, the deflection electrode pieces 50a, 50b, and 50c and the detection electrode pieces 40a, 40b, and 40c have a large y-axis width.

Note that, if the distance g is excessively large, a y-axis dimension of a region provided with the deflection electrode 50 and the detection electrode 40 might be excessively small with respect to a y-axis dimension of the flow path 10a. In such a case, more ions I are failed to be caught by the detection electrode 40. Hence, the maximum detection sensitivity of the ions I might decrease.

From the above viewpoint, the distance g is preferably 0.001 times or more and 0.5 times or less of the width w, and more preferably, 0.002 times or more and 0.2 times or less of the width w. The distance g is preferably 0.0002 times or more and 0.1 times or less of the y-axis dimension of the flow path 10a, and more preferably, 0.0005 times or more and 0.05 times or less of the y-axis dimension of the flow path 10a. Moreover, a z-axis dimension d of the flow path 10a is preferably 0.001 times or more and 0.01 times or less of the y-axis dimension of the flow path 10a, and more preferably, 0.002 times or more and 0.005 times or less of the y-axis dimension of the flow path 10a.

Furthermore, when a voltage is applied to one or more of the plurality of deflection electrode pieces 50a, 50b, and 50c, an undesirable electric field is generated such that analysis precision decreases. In order to reduce the decrease in analysis precision, preferably, a correction coefficient for each voltage application pattern to the deflection electrode pieces 50a, 50b, 50c is previously stored in a not-shown storage unit of the control unit 70, and the ion concentration is calculated in accordance with the correction coefficient.

Specifically, for example, correction coefficients 1 to 5 below are previously set and stored in the storage unit of the control unit 70. Then, the appropriate correction coefficients 1 to 5, which are based on the deflection electrode pieces 50a, 50b and 50c to which a voltage is applied, and a current value from the detection electrode 40 are used to calculate the ion concentration. Hence, the ion concentration can be calculated with high precision.

Correction Coefficient 1: a correction coefficient to be used when a voltage is applied to all of the deflection electrode pieces 50a, 50b, and 50c.

Correction Coefficient 2: a correction coefficient to be used when a voltage is applied to either the deflection electrode piece 50a or the deflection electrode piece 50c.

Correction Coefficient 3: a correction coefficient to be used when a voltage is applied to the deflection electrode piece 50b.

Correction Coefficient 4: a correction coefficient to be used when a voltage is applied to either the deflection electrode piece 50a or the deflection electrode piece 50c and to the deflection electrode 50b.

Correction Coefficient 5: a correction coefficient to be used when a voltage is applied to the deflection electrode pieces 50a and 50c.

Note that, in setting the correction coefficients, for example, the analysis device 1 is used to analyze a known ion concentration of the sample S. The correction coefficients can be set in accordance with a difference between the ion concentration of the sample S and the actually measured ion concentration.

Described below will be other examples of the preferred embodiments of the present disclosure. In the description below, members having substantially the same functions as those of the first embodiment are denoted by the same reference signs, and description of such members are omitted. Moreover, also in the embodiments below, FIG. 1 is referred to as seen in the first embodiment.

Second Embodiment

Figure 5:
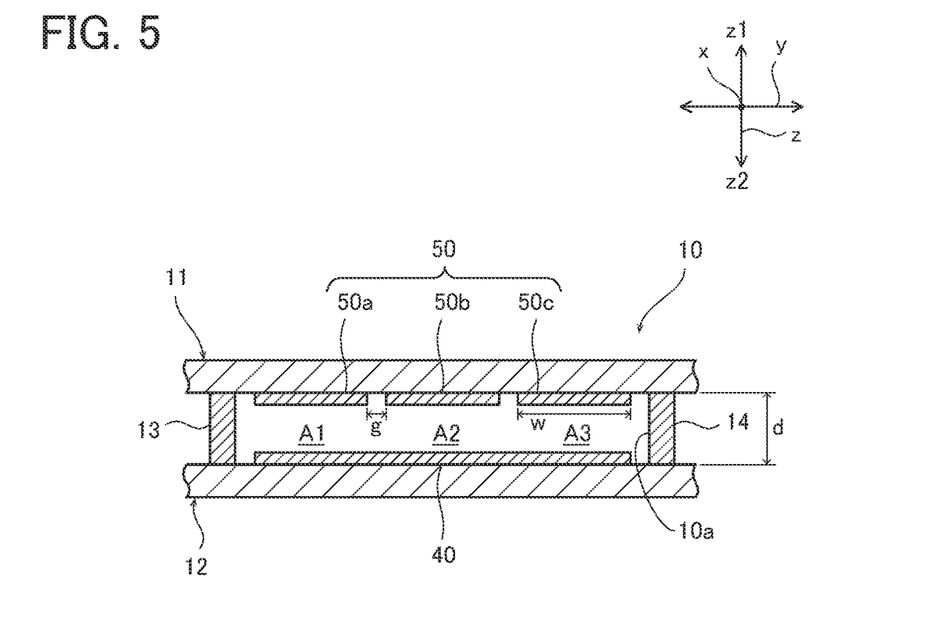
FIG. 5 is a schematic cross-sectional view of a flow path forming member according to a second embodiment.

FIG. 5 is a schematic cross-sectional view of a flow path forming member according to a second embodiment.

As illustrated in FIG. 5, an analysis device according to the second embodiment differs in the configuration of the detection electrode 40 from the analysis device 1 according to the first embodiment.

The first embodiment describes an example in which the detection electrode 40 includes the plurality of detection electrode pieces 40a, 40b, and 40c corresponding to the deflection electrode pieces 50a, 50b, and 50c. On the other hand, in the second embodiment, the detection electrode 40 is formed into a single-piece electrode. The detection electrode 40 is positioned across from each of the deflection electrode pieces 50a, 50b, and 50c.

As seen in this embodiment, even if the detection electrode 40 is a single-piece electrode, the ion concentration can be analyzed with high precision as seen in the first embodiment.

Third Embodiment

Figure 6:
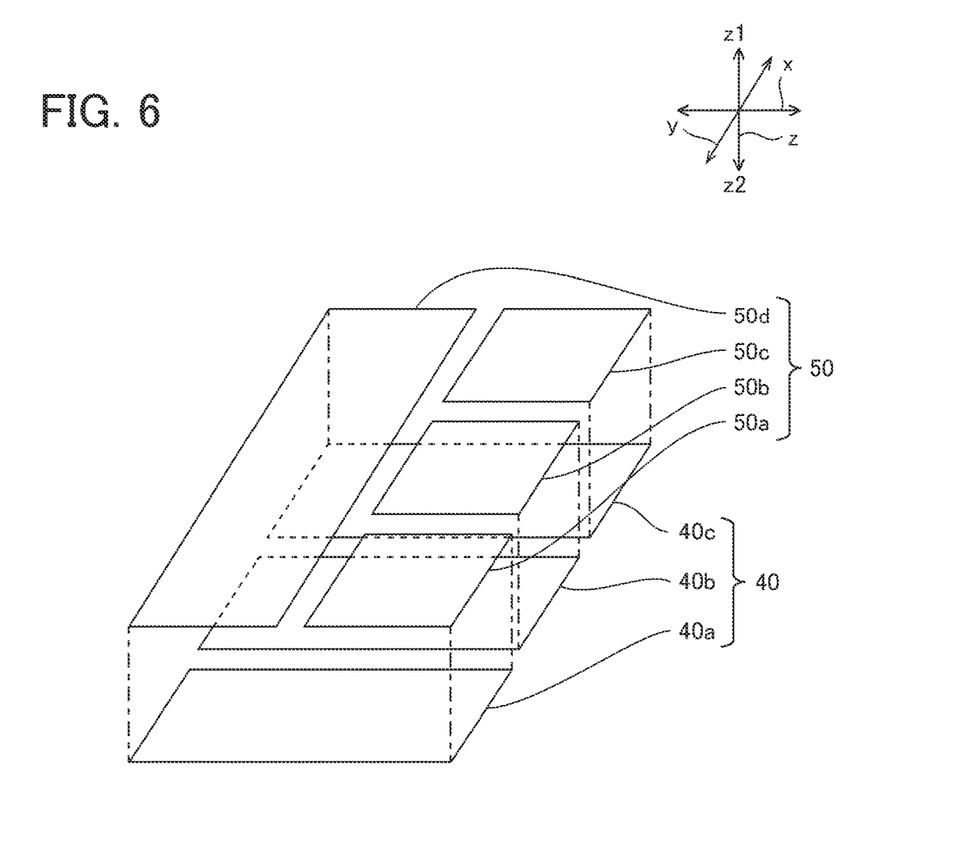
FIG. 6 illustrates schematic perspective views of a deflection electrode and a detection electrode according to a third embodiment.

FIG. 6 illustrates schematic perspective views of a deflection electrode and a detection electrode according to a third embodiment.

An analysis device according to the third embodiment differs in the configuration of the deflection electrode 50 from the analysis device 1 according to the first embodiment.

In the third embodiment, the deflection electrode 50 includes the plurality of first deflection electrode pieces 50a, 50b, and 50c arranged in the y-axis direction, and further includes a second deflection electrode piece 50d. The second deflection electrode piece 50d is provided in the x-axis direction in which the flow path 10a extends, and disposed in a position different from the positions of the plurality of first deflection electrode pieces 50a, 50b, and 50c. The second deflection electrode piece 50d is disposed either toward the inlet (toward the x1) or toward the outlet (toward the x2) with respect to the plurality of the first deflection electrode pieces 50a, 50b, and 50c. The second deflection electrode piece 50d is lager in y-axis dimension than the first deflection electrode pieces 50a, 50b, and 50c. The second deflection electrode piece 50d extends in the y-axis direction across a region in which at least two of the plurality of first deflection electrode pieces 50a, 50b, and 50c are provided. Specifically, in this embodiment, the second deflection electrode piece 50d is provided in the y-axis direction across all of the plurality of first deflection electrode pieces 50a, 50b, and 50c. More specifically, the second deflection electrode piece 50d is provided to extend in the y-axis direction from an end portion to another end portion of the region in which the plurality of first deflection electrode pieces 50a, 50b, and 50c are provided. The second deflection electrode piece 50d is positioned across the flow path 10a from the detection electrode 40 in the z-axis direction.

Described next will be an ion analysis technique according to the third embodiment.

Also in the third embodiment, if a current value detected by the detection electrode 40 exceeds the detectable range as seen in the first embodiment, a voltage is applied to the deflection electrode 50 to reduce the y-axis width of the region in which the voltage is applied to the deflection electrode 50. In the third embodiment, a deflection electrode piece to which a voltage is applied is selected from among the plurality of first deflection electrode pieces 50a, 50b, 50c and the second deflection electrode piece 50d, so that the current value detected by the detection electrode 40 comes within the detectable range. Hence, the current value detected by the detection electrode 40 comes within the detectable range, and, after that, in accordance with the detected current value, the ion concentration is calculated. Hence, as seen in the first embodiment, the ion concentration can be analyzed with high precision.

Figure 7:
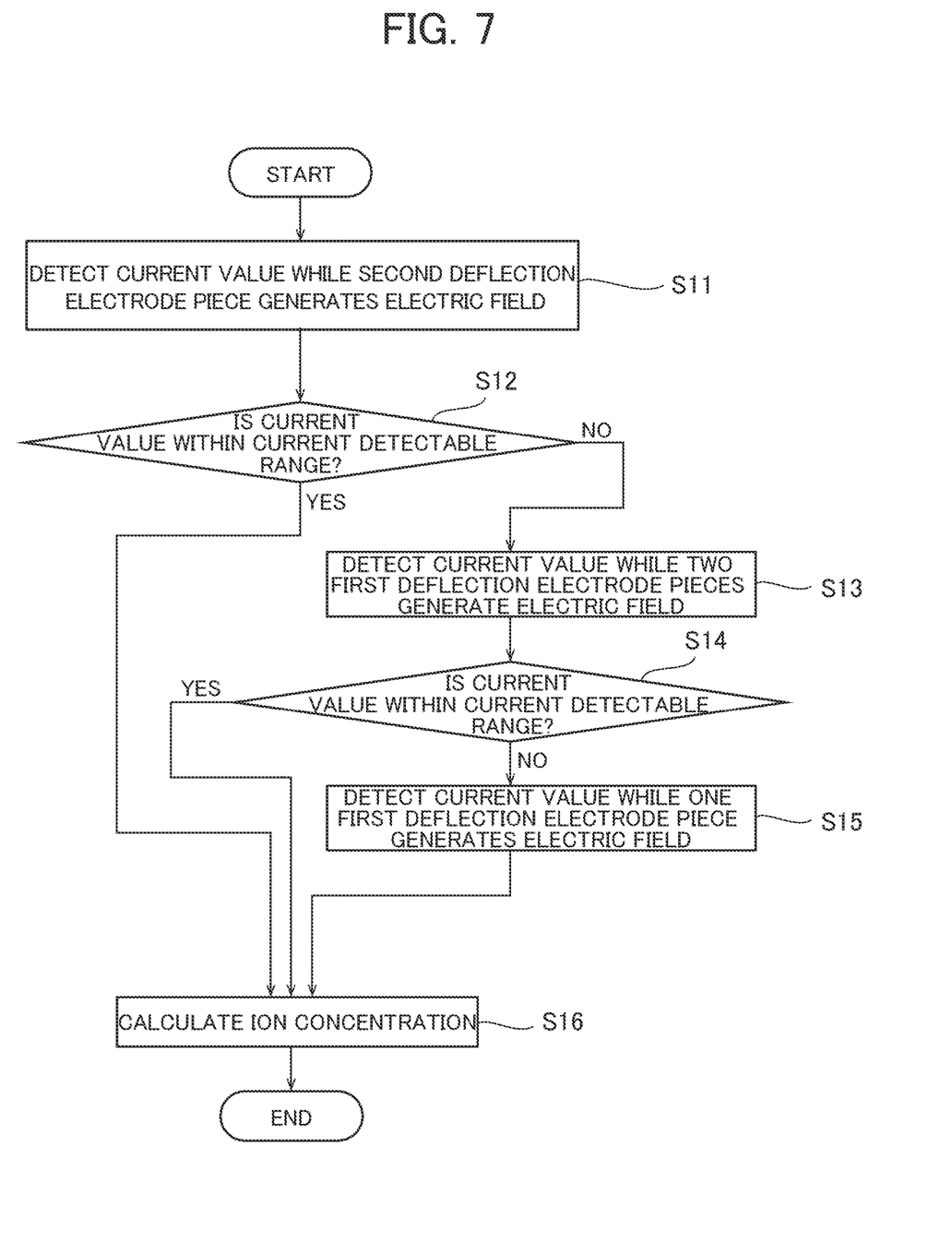
FIG. 7 is a flowchart showing an example of an ion analysis technique according to the third embodiment.

Specifically, as shown in FIG. 7, first, at Step S11, the control unit 70 detects a current value while applying a voltage to the second deflection electrode piece 50d to generate an electric field. This is because the electric field generated at the second deflection electrode piece 50d can maximize the y-axis width of the electric field.

Next, at Step S12, the control unit 70 determines whether the current value detected at Step S11 is within the detectable range. If the determination indicates that the current value detected at Step S12 is within the detectable range, the process proceeds to Step S16.

On the other hand, if the determination at Step S12 indicates that the current value is out of the detectable range (the current value exceeds the detectable range), the process proceeds to Step S13. At Step S13, the control unit 70 applies a voltage to two of the three first deflection electrode pieces 50a, 50b and 50c to generate an electric field, and detects a current value of the detection electrode 40.

Next, at Step S14, the control unit 70 determines whether the current value detected at Step S13 is within the detectable range. If the determination indicates that the current value detected at Step S14 is within the detectable range, the process proceeds to Step S16.

On the other hand, if the determination at Step 14 indicates that the current value is out of the detectable range, the process proceeds to Step S15. At Step S15, the control unit 70 applies a voltage to one of the three first deflection electrode pieces 50a, 50b and 50c to generate an electric field, and detects a current value of the detection electrode 40. After that, the process proceeds to step S16.

At Step S16, the ion concentration is calculated in accordance with the current value detected last.

In the third embodiment, first, a current value is detected while an electric field is generated at the second deflection electrode piece 50d having a large y-axis dimension. Hence, many ions I can be captured when the ion concentration is low. Such a feature makes it possible to analyze the ion concentration more precisely when the ion concentration is low.

Fourth and Fifth Embodiments

Figure 8:
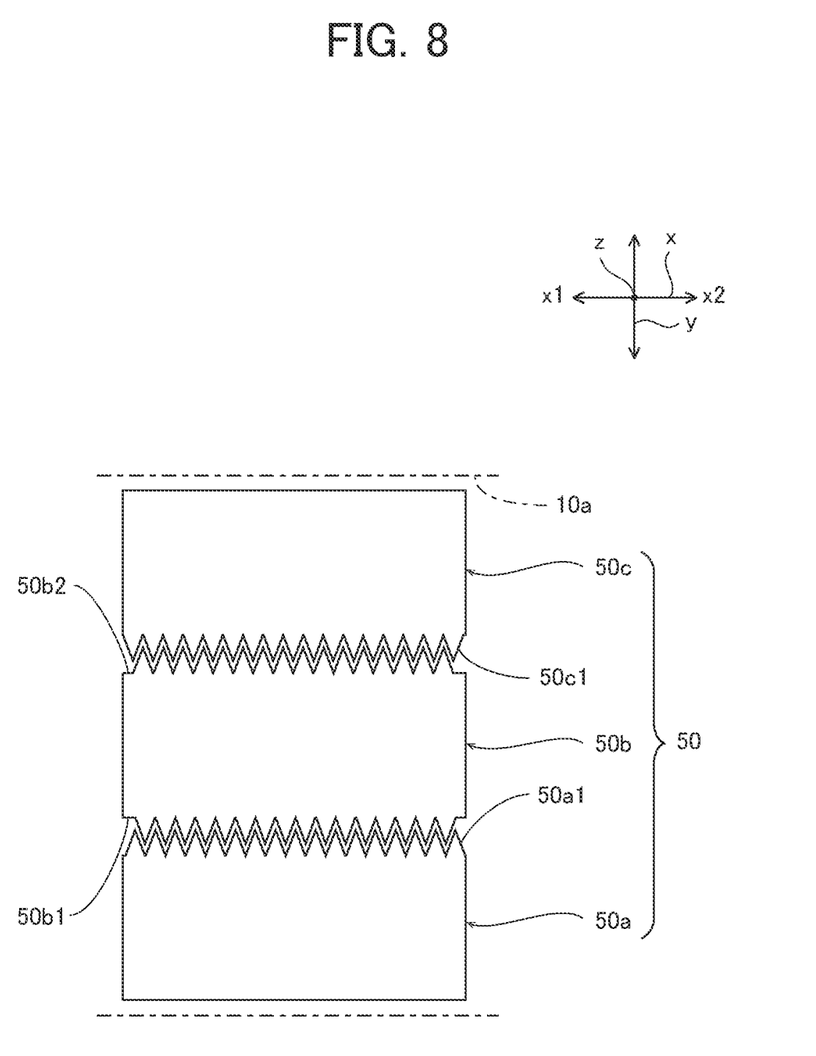
FIG. 8 is a schematic plan view of a deflection electrode according to a fourth embodiment.
Figure 9:
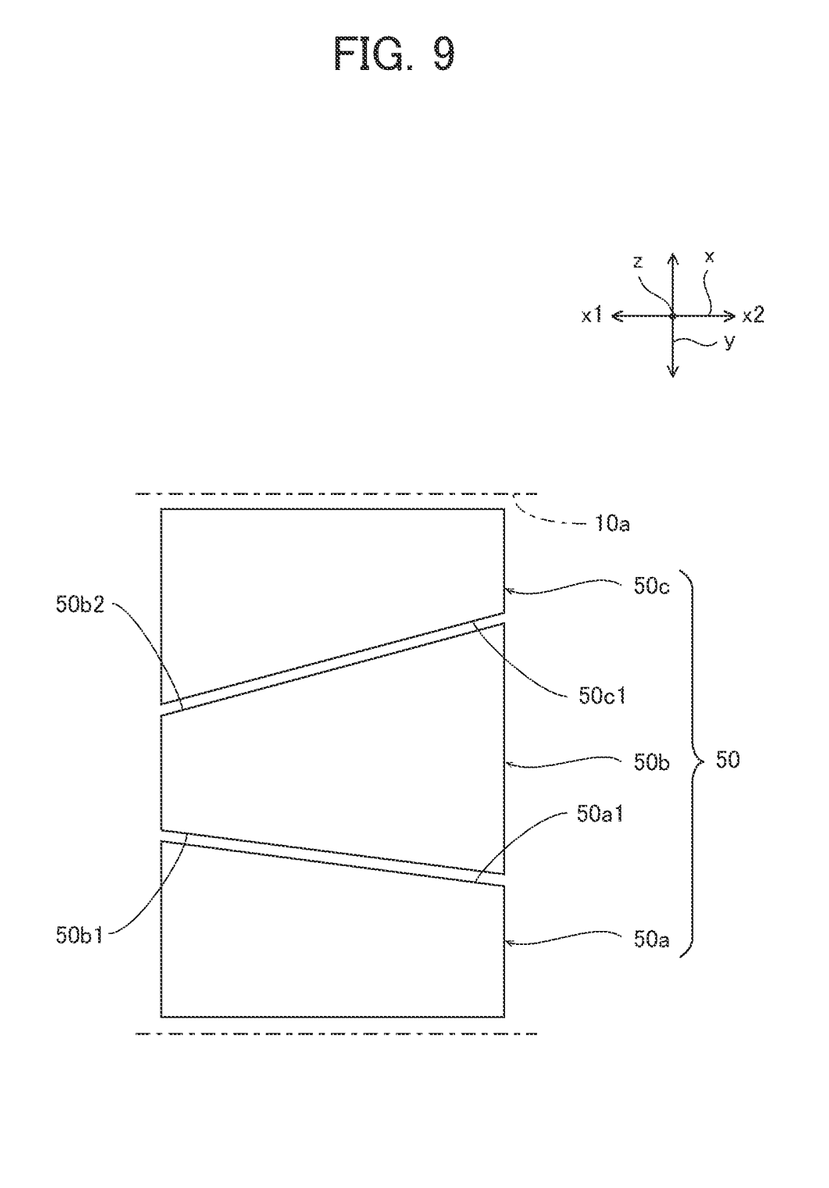
FIG. 9 is a schematic plan view of a deflection electrode according to a fifth embodiment.

FIG. 8 is a schematic plan view of a deflection electrode according to a fourth embodiment. FIG. 9 is a schematic plan view of a deflection electrode according to a fifth embodiment.

As shown in FIGS. 8 and 9, in the fourth and fifth embodiments, the first deflection electrode pieces 50a, 50b and 50c adjacent to each other in the y-axis direction have portions overlapping with each other in the x-axis direction. Hence, when a voltage is applied to the adjacent first deflection electrode pieces 50a, 50b, and 50c to generate an electric field, the ions I can be kept from passing through gaps between the adjacent first deflection electrode pieces 50a, 50b, and 50c. Hence, many ions I can be captured by detection electrode 40. Such a feature makes it possible to analyze the ion concentration more precisely in particular when the ion concentration is low.

Specifically, as illustrated in FIG. 8, the fourth embodiment shows a case where an end side 50a1 of the first deflection electrode piece 50a toward the first deflection electrode piece 50b, opposing end sides 50b1 and 50b2 of the first deflection electrode piece 50b, and an end side 50c1 of the first deflection electrode piece 50c toward the first deflection electrode piece 50b have zigzag shapes. In the fourth embodiment, the first deflection electrode pieces 50a, 50b, and 50c are substantially the same in area.

As illustrated in FIG. 9, the fifth embodiment shows a case where each of the end sides 50a1, 50b1, 50b2, and 50c1 linearly extends in a direction angled with respect to the x-axis direction.

Sixth and Seventh Embodiments

Figure 10:
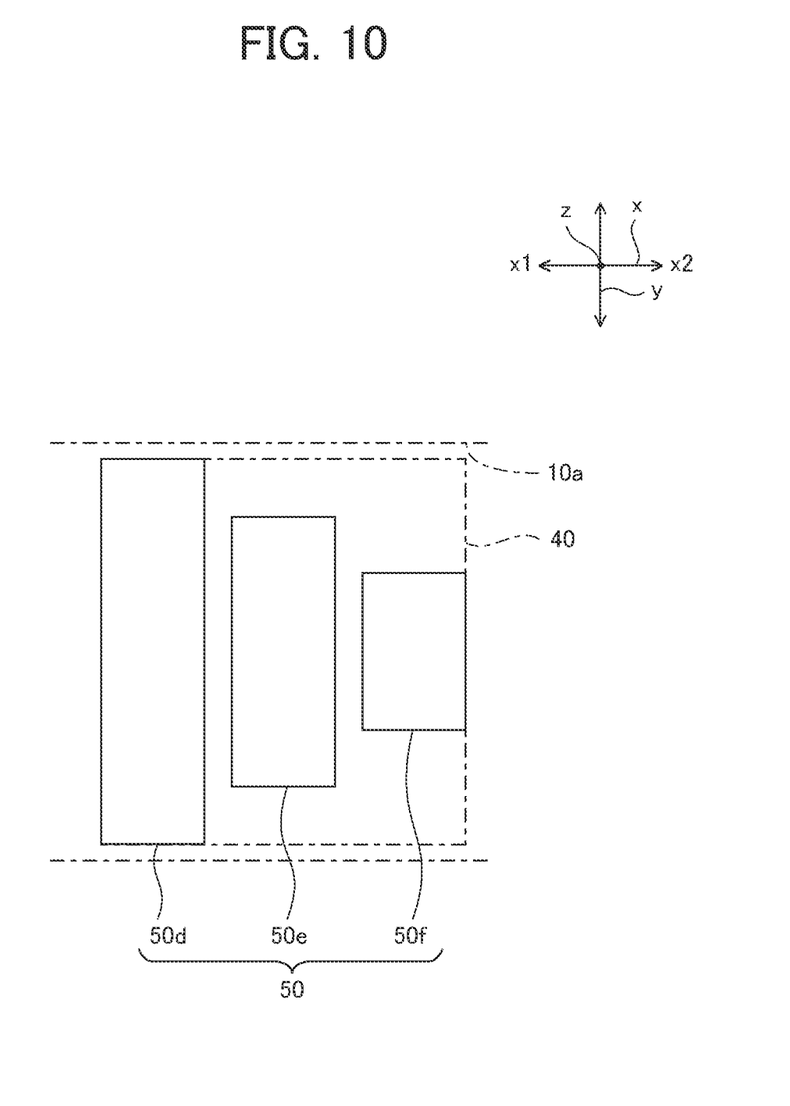
FIG. 10 is a schematic plan view of a deflection electrode according to a sixth embodiment.
Figure 11:
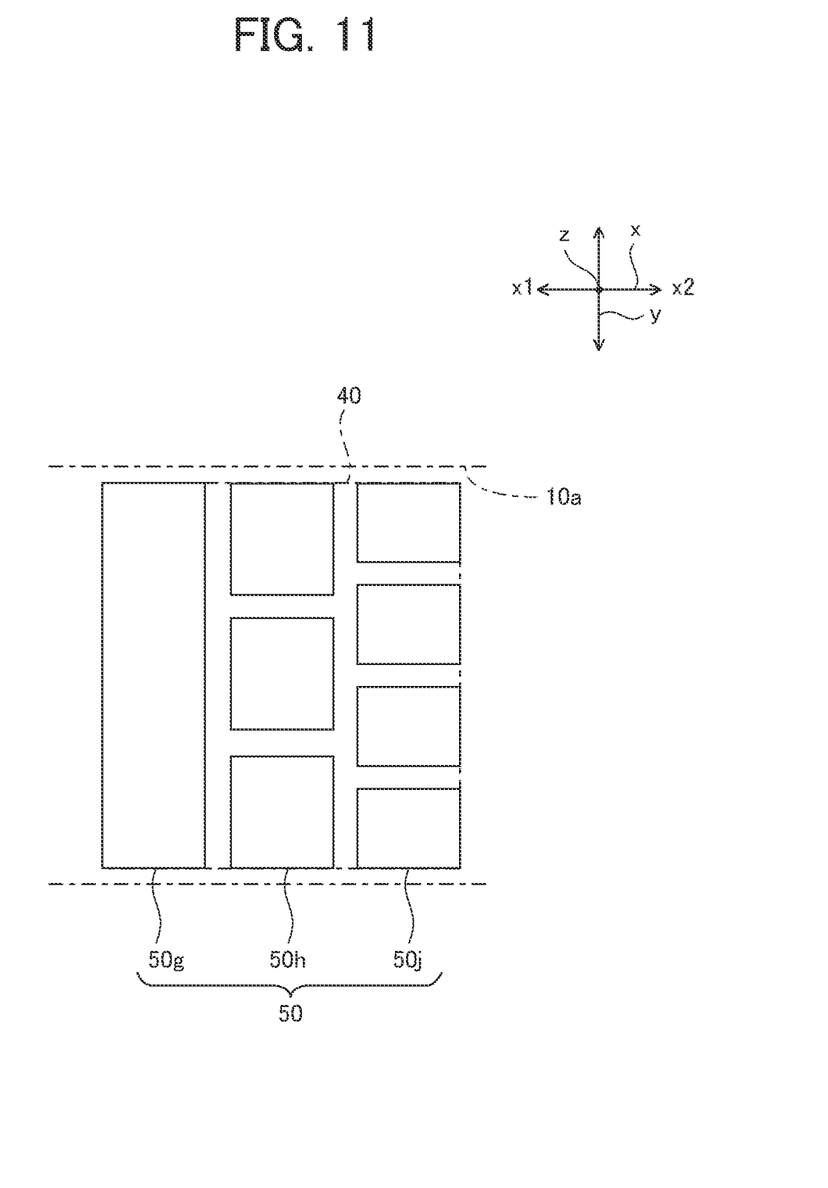
FIG. 11 is a schematic plan view of a deflection electrode according to a seventh embodiment.

FIG. 10 is a schematic plan view of a deflection electrode according to a sixth embodiment. FIG. 11 is a schematic plan view of a deflection electrode according to a seventh embodiment.

The sixth and seventh embodiments differ in the configuration of the deflection electrode 50 from the first embodiment.

In the sixth and seventh embodiments, the deflection electrode 50 includes a plurality of deflection electrode pieces arranged at intervals in the x-axis direction, and the plurality of deflection electrode pieces include at least two deflection electrode pieces each having a different dimension in the y-axis direction; that is, the width direction. Hence, also as to the analysis devices according to the sixth embodiment and the seventh embodiment, the deflection electrode piece to which a voltage is applied is appropriately selected, thereby successfully changing a y-axis width of a region in which the electric field is generated in the flow path 10a. Thus, even if the ion concentration is high, a current value of the detection electrode 40 can be adjusted to come within the detectable range. As a result, the ion concentration can be analyzed with high precision.

As illustrated in FIG. 10, in the sixth embodiment, specifically, the deflection electrode 50 includes a plurality of deflection electrode pieces 50d, 50e, and 50f. The plurality of deflection electrode pieces 50d, 50e, and 50f are arranged at intervals in the x-axis direction. The plurality of deflection electrode pieces 50d, 50e, and 50f are different in y-axis dimension from each other. Specifically, the deflection electrode piece 50d has the largest y-axis dimension, and the deflection electrode piece 50f has the smallest y-axis dimension. In this embodiment, x-axis center lines of the plurality of deflection electrode pieces 50d, 50e, and 50f are substantially aligned with one another. Note that the present disclosure shall not be limited to such an example. The center lines of the plurality of deflection electrode pieces lie in the direction in which the respective flow paths extend. These center lines do not have to be aligned with one another.

In the analysis device according to the sixth embodiment, the control unit 70 applies a voltage to any one of the plurality of deflection electrode pieces 50d, 50e, and 50f so that the current value detected by the detection electrode 40 comes within a detectable range. Then, the control unit 70 calculates the ion concentration using the current value detected in the application of the voltage.

Specifically, first, the control unit 70 applies a voltage to the deflection electrode piece 50d having the largest y-axis dimension to generate an electric field. Then, the control unit 70 detects a current value. Next, the control unit 70 determines whether the detected current value is within the detectable range. If the detected current value is out of the detectable range, the control unit 70 gradually applies a voltage to the deflection electrode pieces 50e and 50f having small y-axis dimensions to generate an electric field. Then, the control unit 70 detects a current value. Hence, a current value within the detectable range is detected, and, in accordance with the detected current value, the ion concentration is calculated. Hence, the ion concentration can be analyzed with high precision.

As illustrated in FIG. 11, in the seventh embodiment, specifically, the deflection electrode 50 includes a deflection electrode piece 50g, and a plurality of deflection electrode pieces 50h and a plurality of deflection electrode pieces 50j. The deflection electrode piece 50g, the plurality of deflection electrode pieces 50h, and the plurality of deflection electrode pieces 50j are spaced apart from each other in the x-axis direction. The deflection electrode pieces 50g, 50h, and 50j are different in y-axis dimension from each other. The deflection electrode piece 50g has the largest y-axis dimension, and the deflection electrode pieces 50j have the smallest y-axis dimension.

Specifically, the deflection electrode piece 50g is provided to extend substantially from one end portion to another end portion of the flow path 10a in the y-axis direction.

Three deflection electrode pieces 50h are arranged at intervals in the x-axis direction. The y-axis dimension of the deflection electrode pieces 50h is approximately one third of the y-axis dimension of the deflection electrode piece 50g.

Four deflection electrode pieces 50j are arranged at intervals in the x-axis direction. The y-axis dimension of the deflection electrode pieces 50j is approximately a quarter of the y-axis dimension of the deflection electrode piece 50g.

In the seventh embodiment, six patterns below can be used to determine a y-axis length of a region to which an electric field is applied by the deflection electrode 50. Such a feature makes it possible to adjust more precisely the number of ions I reaching the detection electrode 40.

Pattern 1: The deflection electrode piece 50g applies an electric field.

Pattern 2: Three deflection electrode pieces 50j apply an electric field.

Pattern 3: Two deflection electrode pieces 50h apply an electric field.

Pattern 4: Two deflection electrode pieces 50j apply an electric field.

Pattern 5: One deflection electrode piece 50h applies an electric field.

Pattern 6: One deflection electrode piece 50j applies an electric field.

In the analysis device according to the seventh embodiment, the control unit 70 applies a voltage to the deflection electrode piece 50g, to at least one of the plurality of deflection electrode pieces 50h, or to at least one of the plurality of deflection electrode pieces 50j, so that a current value detected by the detection electrode 40 comes within a detectable range. Then, the control unit 70 calculates the ion concentration using the current value detected in the application of the voltage.

Specifically, first, the control unit 70 applies a voltage to the deflection electrode piece 50g having the largest y-axis dimension to generate an electric field. Then, the control unit 70 detects a current value (Pattern 1). Next, the control unit 70 determines whether the detected current value is within the detectable range. If the detected current value is out of the detectable range, the control unit 70 sequentially detects a current value while changing patterns from Pattern 2 to Pattern 6 to reduce the y-axis dimension of a region to which the electric field is applied. Hence, the detected current value is within the detectable range, and, in accordance with the detected current value, the ion concentration is calculated. Hence, the ion concentration can be analyzed with high precision.

Eighth Embodiment

The first to seventh embodiments describe examples in which currents from a plurality of detection electrode pieces included in the detection electrode 40 are collectively input to the control unit 70. Note that the present disclosure shall not be limited to such an example. For example, currents from a plurality of detection electrode pieces may be separately input to the control unit 70. In such a case, the control unit 70 may calculate the ion concentration in accordance with a current value obtained within the detectable range by appropriately adding the currents from the plurality of detection electrode pieces. In such a case, deflection electrode pieces to which the voltage is applied do not have to be changed, so that the ion concentration can be analyzed quickly.

The invention claimed is:

1. An analysis device, comprising:
an ion separating unit configured to selectively conduct a specific kind of ions from among a plurality of kinds of ions flowing through a flow path;
a detection electrode provided in the flow path and disposed toward an outlet with respect to the ionization unit; and
a deflection electrode positioned across the flow path from the detection electrode, and configured to generate an electric field that moves the specific kind of ions toward the detection electrode,
wherein the deflection electrode is capable of adjusting a width of a region in which the electric field is generated in a width direction perpendicular to a direction in which the flow path extends.

2. The analysis device according to claim 1,
wherein the deflection electrode includes a plurality of first deflection electrode pieces arranged at intervals in the width direction.

3. The analysis device according to claim 2,
wherein, the deflection electrode further includes a second deflection electrode piece: provided in the direction in which the flow path extends and disposed in a position different from positions of the plurality of first deflection electrode pieces; and extending in the width direction across a region in which at least two of the plurality of first deflection electrode pieces are provided.

4. The analysis device according to claim 2,
wherein the plurality of first deflection electrode pieces adjacent to each other in width direction have portions overlapping with each other in the direction in which the flow path extends.

5. The analysis device according to claim 1,
wherein the deflection electrode includes a plurality of deflection electrode pieces arranged at intervals in the direction in which the flow path extends, and
the plurality of deflection electrode pieces include at least two deflection electrode pieces each having a different dimension in the width direction.

6. The analysis device according to claim 1, further comprising
a control unit configured to apply a voltage to the deflection electrode, and to calculate an ion concentration in accordance with a current value detected by the detection electrode,
wherein the control unit applies the voltage to the deflection electrode so that the current value detected by the detection electrode comes within a detectable range of the current value.

7. The analysis device according to claim 6,
wherein, if the current value detected by the detection electrode exceeds the detectable range of the current value, the control unit applies the voltage to the deflection electrode to reduce a width of a region in which the voltage is applied to the deflection electrode.

8. The analysis device according to claim 2,
a control unit configured to apply a voltage to the deflection electrode, and to calculate an ion concentration in accordance with a current value detected by the detection electrode,
wherein the control unit selects, from among the plurality of first deflection electrodes, a first deflection electrode to which the voltage is applied, so that the current value detected by the detection electrode comes within a detectable range of the current value.

9. The analysis device according to claim 3, further comprising
a control unit configured to apply a voltage to the deflection electrode, and to calculate an ion concentration in accordance with a current value detected by the detection electrode,
wherein the control unit selects, from among the plurality of first deflection electrodes and the second deflection electrode, a deflection electrode to which the voltage is applied, so that the current value detected by the detection electrode comes within a detectable range of the current value.

10. The analysis device according to claim 5, further comprising
a control unit configured to apply a voltage to the deflection electrode, and to calculate an ion concentration in accordance with a current value detected by the detection electrode,
wherein the control unit applies the voltage to at least one of the plurality of deflection electrode pieces, so that the current value detected by the detection electrode comes within a detectable range of the current value.

* * * * *